Dec. 7, 1954 K. S. LION ET AL 2,696,584
ELECTRIC CIRCUIT
Filed June 2, 1948 3 Sheets-Sheet 1

Inventors
Kurt S. Lion
John W. Sheetz 3rd.
by Rines & Rines
Attorney

Dec. 7, 1954          K. S. LION ET AL          2,696,584
                      ELECTRIC CIRCUIT
Filed June 2, 1948                     3 Sheets-Sheet 2

Inventors
Kurt S. Lion
John W. Sheetz 3rd.
by Riner my Riner
Attorney

Dec. 7, 1954　　K. S. LION ET AL　　2,696,584
ELECTRIC CIRCUIT

Filed June 2, 1948　　3 Sheets-Sheet 3

Inventors
Kurt S. Lion
John W. Sheetz 3rd.
By Rines and Rines
Attorney

United States Patent Office 2,696,584
Patented Dec. 7, 1954

2,696,584

ELECTRIC CIRCUIT

Kurt S. Lion, Watertown, and John W. Sheetz 3rd, Cambridge, Mass.

Application June 2, 1948, Serial No. 30,546

32 Claims. (Cl. 321—38)

The present invention relates to electric circuits and more particularly to circuits employing discharge tubes.

In 1932, Lothar Rohde disclosed in an article entitled "Gasentladungen bei sehr hohen Frequenzen," appearing on pages 569 through 599 of volume 12 of the Annalen der Physik, that if a gas-filled tube having two internal electrodes is inserted in an alternating-current field of sufficient intensity to produce a discharge within the tube, such as, for example, in the field produced by the coil of a radio-frequency tuned circuit, that a direct-current voltage will be developed between the two electrodes. The polarity of this direct-current voltage was found to be determined by the field distribution surrounding the tube. A similar phenomenon has also been observed in low-pressure mercury tubes, as disclosed in U. S. Patent No. 2,152,639 issued on April 4, 1939, to Harold E. Edgerton.

An object of the present invention is to provide a new and improved gas-discharge circuit for producing these direct-current voltages from alternating electric fields.

Another object is to provide a new and improved circuit of the character described for converting or transducing mechanical vibrations or motions into corresponding electrical voltages. In this connection, the present invention provides new and improved microphones, phonograph pick-ups, gyroscope pick-offs, strain gauges, seismographs, vibration indicators and similar devices.

A further object of the present invention is to provide a novel micrometer embodying a circuit of the character described. New and improved linear position indicators and angle indicators are also provided.

An additional object of the present invention is to provide a new and improved pressure indicator.

Still a further object is to provide a new and improved bridge circuit for measuring electric impedances, changes in impedances, dielectric constants, conductivity constants and other electric and magnetic variations.

Another object of the present invention is to provide a new and improved field-strength indicator.

Other and further objects will be explained hereinafter and will be particularly pointed out in the appended claims.

Figure 2:
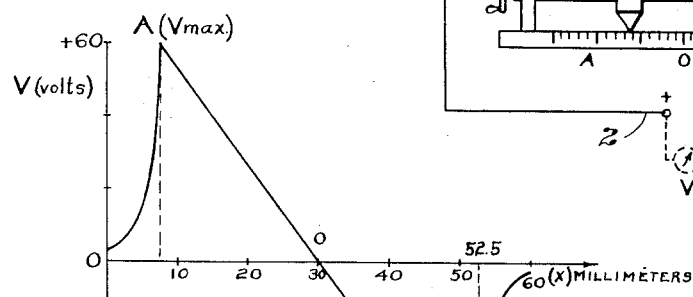
Figure 3:
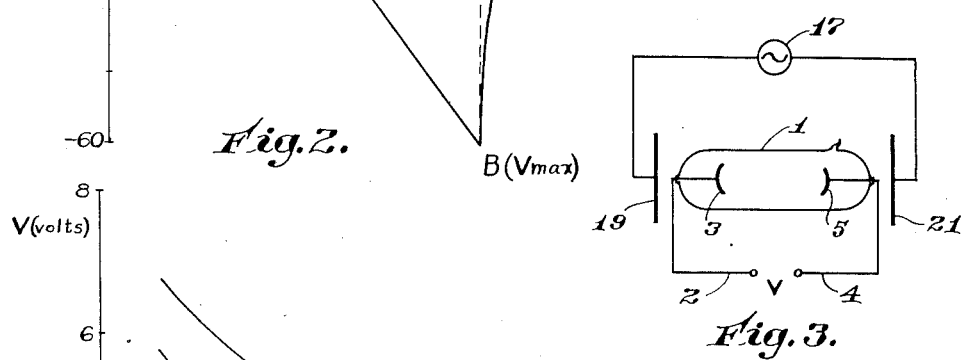
Figure 5:
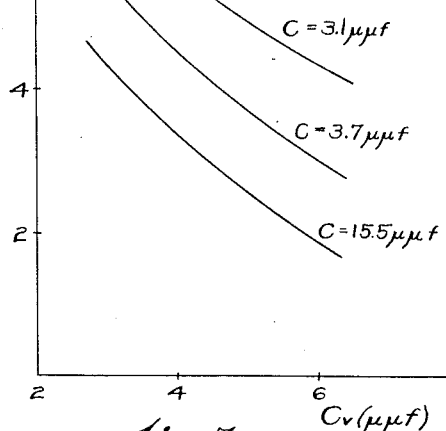
Figure 4:
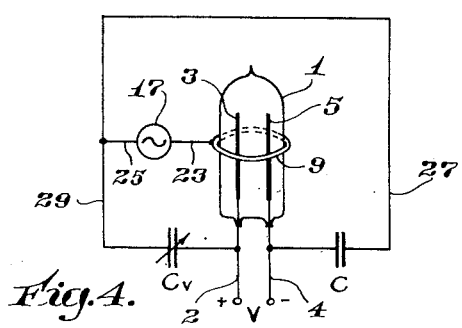
Figure 6:
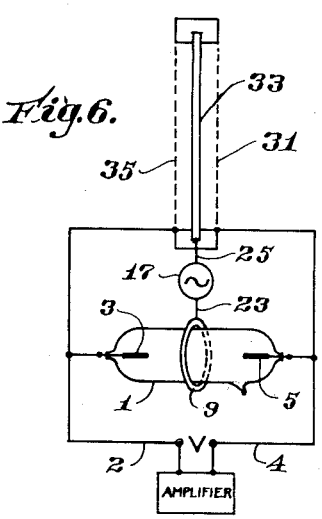
Figure 7:
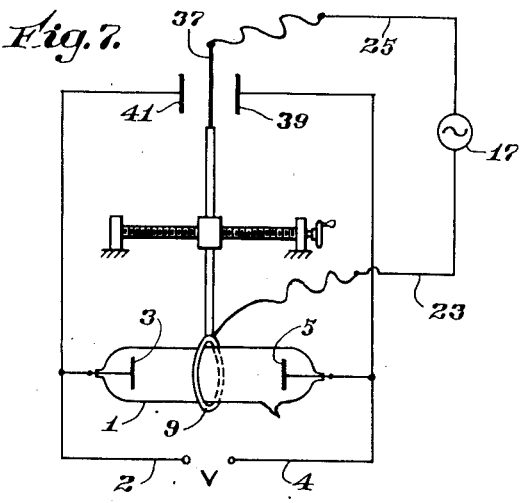
Figure 8:
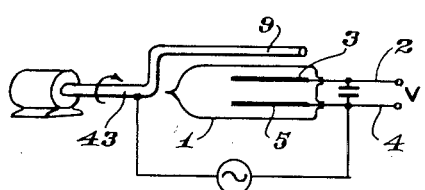
Figure 9:
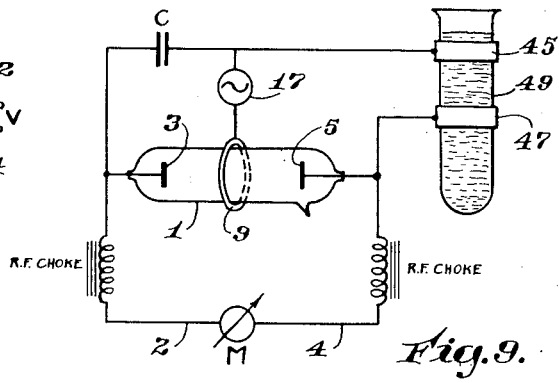
Figure 10:
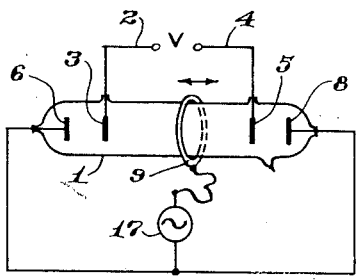
Figure 11:
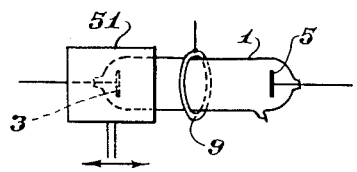
Figure 12:
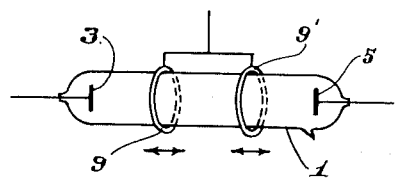
Figure 13:
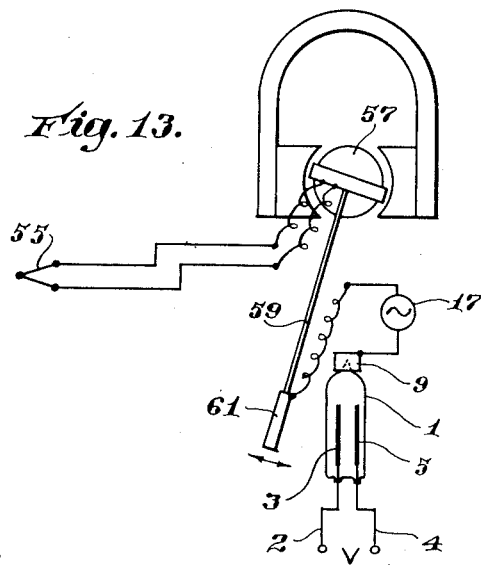
Figure 14:
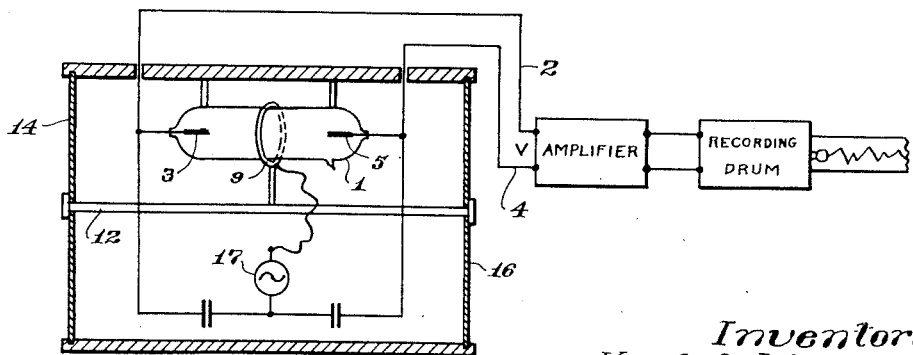

The invention will now be described in connection with the accompanying drawings, Fig. 1 of which illustrates a basic circuit diagram of an apparatus constructed in accordance with the features of the present invention; Fig. 2 is an experimental plot of the sensitivity of the apparatus of Fig. 1; Fig. 3 is a modified circuit for producing results similar to those obtained with apparatus of Fig. 1; Fig. 4 is a similar circuit constructed in accordance with a preferred embodiment of the present invention, illustrating a bridge-type circuit; Fig. 5 illustrates experimentally obtained sensitivity characteristic curves of the circuit of Fig. 4; Fig. 6 is a modification of the apparatus of Fig. 4 which may be employed as a microphone; Fig. 7 is a further modification illustrating a more sensitive means of controlling the bridge circuit; Fig. 8 is a modification adapted for angle indicating purposes; Fig. 9 illustrates a modified bridge circuit adapted for dielectric and conductivity measurements; Figs. 10, 11 and 12 illustrate modified electrode structures; Fig. 13 is a modification of the circuits of the present invention illustrating a relay system; and Fig. 14 illustrates a vibration indicator constructed in accordance with the circuit of Fig. 1.

Figure 1:
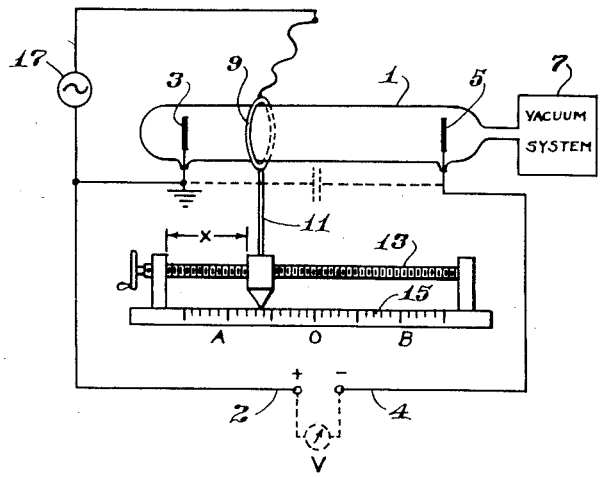

A gas-discharge tube is illustrated in Fig. 1 as provided with two principal preferably internal electrodes 3 and 5 spaced from one another in an envelope 1. The envelope 1 is preferably constituted of glass or similar electric-wave permeable material, though metal and other conducting envelopes may be employed under some circumstances, as will later be discussed. The principal electrodes 3 and 5 are shown as plane metal discs, but any electrode configuration, including thin wires, may be used.

The envelope 1 may be filled with any desired ionizable dielectric medium such as a gas under low, medium or high pressure. While helium and neon gas have been found to be particularly well-suited to the purposes of the present invention, any other ionizable media such as air, hydrogen, argon, krypton, mercury vapor, to mention but a few, may also be employed. The dielectric medium may, if desired, be sealed under pressure within the envelope 1, or it may be continuously maintained under pressure by means of a vacuum system 7. The vacuum system 7 may, as an illustration, comprise a conventional single-stage mercury diffusion pump, a liquid air trap, and a McCleod pressure-gauge indicator, not shown for the purpose of simplicity. If, for example, the envelope 1 is to be filled with helium, the helium may be maintained at any desired pressure by this vacuum system 7, as is well-known in the art.

A third auxiliary electrode 9, preferably in the form of a ring or band external to and surrounding the envelope 1, is shown carried by a member 11 which may be moved laterally by means of a rotatable screw 13. The electrode 9 may thus be moved from one end to the other of envelope 1 by rotation of the screw 13, and the position $x$ of the third electrode from, for example, the electrode 3, may be measured upon a scale 15.

An alternating-current or pulsating-current, hereinafter referred to as "alternating-current," voltage oscillator 17 may be connected between the third or movable electrode 9 and the electrode 3, which may, if desired, be grounded as shown. The oscillator 17 is preferably a radio-frequency signal generator, though lower-frequencied oscillators of audio, ultrasonic and video frequencies may be employed. An output circuit comprising conductors 2 and 4 is connected between the electrodes 3 and 5, and no source of energy such as a battery of other device is required in the output circuit. A meter, shown dotted, as an illustration, may be directly connected across the output circuit 2—4. Providing the peak voltage of the alternating potential impressed between the electrodes 3 and 9 produces a field sufficient to cause the gas in the tube 1 to ionize, a direct-current potential V will be produced between the electrodes 3 and 5 in the output circuit 2—4, even though no battery or other source of energy is connected in the output circuit. A much smaller voltage is required to ionize a gas at radio frequencies than at lower frequencies so that the radio-frequency spectrum is particularly useful for this and for other reasons. At radio frequencies furthermore, relatively high-pressure gases, such as the before-mentioned helium and neon are preferable.

As the electrode 9 is moved closer to the electrode 3 than to the electrode 5, the direct-current output voltage V will have the polarity shown in Fig. 1. When, on the other hand, the electrode 9 is moved closer to the electrode 5, the reverse polarity will obtain in the output circuit 2—4. The magnitude of the voltage V, furthermore, within limits that will later be discussed, increases as the electrode 9 is moved closer to one of the principal electrodes.

Fig. 2 is a reproduction of a characteristic curve that we have experimentally obtained with an air-filled tube similar to that shown in Fig. 1, operated under a pressure of 0.87 millimeter of mercury. The oscillator 17 was operated at a frequency of 23.2 megacycles with a root-mean-square (R. M. S.) amplitude of 100 volts, and was connected between the movable electrode 9 and the grounded electrode 3, as illustrated in Fig. 1. A capacitor of about 0.01 microfarad, shown dotted, was inserted between the principal electrodes 3 and 5 so that both electrodes might be at ground potential with respect to the radio-frequency current of the oscillator 17, but only the electrode 3 would be at direct current ground potential. The spacing between the principal electrodes 3 and 5 was about 60 millimeters. Fig. 2 plots the direct-current voltage V obtained between the output terminals 2 and 4 as a function of the position $x$ of the movable electrode 9 from the electrode 3, as measured on the scale 15. When the electrode 9 was adjusted to a position O, half-way between the principal electrodes 3 and 5, equal length, cone-shaped, elongated glow discharges were observed in the tube 1, glowing from a virtual electrode within the tube 1, corresponding to the electrode 9, towards each of the principal electrodes. For this condition, zero output voltage was measured in the output circuit between the terminals 2 and 4. Since the alternating field produced potential gradients between the electrode 9 and each of the principal electrodes of equal magnitude and opposite polarity, a cancellation of current flow in the ionized gas was produced. As the electrode 9 was moved closer to the electrode 3, by rotating the screw 13 in one direction, the glow discharge between the electrode 9 and the electrode 3 became of shorter length and more intense, while the glow discharge between the movable electrode 9 and the electrode 5 became longer and less intense. This potential gradient differential resulted because the impedance between the electrode 9 (or its virtual electrode inside the tube 1) and the electrode 3 became less than the impedance between the electrode 9 and the other principal electrode 5. Since the potential gradients, therefore, between the electrode 9 and the electrode 3 became greater than the potential gradients between the electrode 9 and the electrode 5, a resultant current flow in the direction from the electrode 3 towards the electrode 5 was produced and a positive direct-current voltage V resulted between the terminals 2 and 4 in the output circuit. The magnitude of the voltage V increased as the electrode 9 approached the electrode 3. When, for example, the separation $x$ of the electrode 9 from the electrode 3 was 21 millimeters, a voltage V of 20 volts was produced; when $x=13$ mm., $V=40$ volts; and when $x=5.0$ mm., $V=60$ volts.

By rotating the screw 13 in the opposite direction so as to move the electrode 9 from the center 0 of the tube 1 towards the electrode 5, the increased potential gradients between the electrode 9 and the electrode 5 became greater than the potential gradients between the electrode 9 and the electrode 3, producing a resultant current flow from the electrode 5 towards the electrode 3. A negative voltage V, therefore, resulted in the output circuit. Because of the approximate symmetry of the principal electrodes, and of the tube structure, the magnitude of the negative voltage V as a function of the displacement of the electrode 9 from the electrode 5 was found to vary substantially in the same manner as the magnitude of the positive voltage V for the corresponding displacements of the electrode 9 from the electrode 3. Had the two electrode structures or the tube construction been unsymmetrical, however, different variations would have been produced. A maximum negative voltage $V_{max}$ of 60 volts was obtained when the electrode 9 was at a position $x=52.5$ mm., or about 6.5 mm. from the electrode 5, as shown in Fig. 2.

A substantially linear variation of direct-current output voltage V from positive to negative values within limits of the adjustment of the electrode 9 from $x=5.0$ to $x=52.5$ mm., therefore, was produced in this particular tube. The sensitivity of the tube 1 in this operating region may be expressed in terms of the voltage V per millimeter of lateral movement or displacement of the electrode 9. The sensitivity of this particular tube was found to be about 2.5 volts per millimeter of displacement. A very sensitive linear-position indicator or ultra-micrometer is thus provided. If, for example, a dimension of an article is to be measured to a high degree of accuracy, the scale would be of little value. If the article is placed between the ring support 11 and a fixed member, such as the mounting for the screw 13, however, as shown by the arrow labelled $x$ in Fig. 1, the output voltage V will accurately measure the dimension $x$ and variations in this dimension.

If the electrode 9 is moved from the center of the tube 1 continuously closer to one of the principal electrodes, therefore, a linear direct-current voltage increase is produced for each unit of movement. Movement towards one principal electrode produces an increasing positive voltage, and movement towards the other electrode an increasing negative voltage. A point is reached, however, when, upon slight further movement of the electrode 9 towards the closer principal electrode, the longer and weaker gas discharge between the electrode 9 and the further principal electrode suddenly breaks away from the surface of the further principal electrode, and a sharp decrease in magnitude of the direct-current output voltage V is produced. The points where this sharp inversion takes place are designated at A and B in Fig. 2.

For the air filled tube previously described, for example, point A was found to occur when the electrode 9 was 5.0 millimeters from the electrode 3, and point B occurred when the electrode 9 was 6.5 millimeters from the electrode 5. Movement of the electrode 9 just one millimeter closer to the electrode 3 from the point A produced a sudden voltage decrease of about 45 volts, while similar movement from the point B towards the electrode 5 produced a sharp 31 volt decrease. Further movement of the electrode 9 towards the closer principal electrode produced smaller and smaller output voltages. Some tubes that were tested displayed other minor points of voltage inversion in the region between, for example, the point A and the electrode 3, where further relatively narrow regions of voltage increase and decrease were obtained.

While the whole region A—B may be used for producing linear voltage variations corresponding to displacements of the electrode 9, the center of the tube may be used as a zero reference on opposite sides of which positive increasing and negative increasing voltages V may be produced. The circuits embodying the present invention, of course, need not be operated about a zero output voltage reference value, but may be operated at any desired reference value. If, for example, the electrode 9 is vibrated back and forth, preferably about the center of the tube 1, such as by oscillating the screw 13, or by any vibrating means, an alternating voltage may be produced in the output circuit 2—4 of peak magnitude linearly related to the vibrational displacement of the electrode 9. The frequency or periodicity of the polarity reversals of the output voltage bears no relation to the frequency or periodicity of the input voltage from the oscillator 17, but is determined by the frequency of vibration of the electrode 9. The ring 9, as a further example, has been mounted on the cone of a loud speaker driven by an audio oscillator, not shown, and alternating voltages up to over 20,000 cycles were successfully produced.

The angular rotation of the screw 13 in Fig. 1, furthermore, is converted into a linear movement of the electrode 9, and a corresponding linear voltage results in the output circuit. Angular movements are thus simply transduced into linear voltages by this apparatus.

Fig. 14 illustrates a linear vibration indicator in which pressure waves vibrate the diaphragms 14 or 16 to cause the arm 12 correspondingly to displace the position of the electrode 9. This apparatus may be used with a recording drum for seismological measurements or as a strain gauge to measure strains applied to the diaphragms.

Substantially linear operation over a somewhat more limited region may also be obtained, of course, on the very steep portion of the characteristic curve just to the left of the point A, or to the right of the point B, illustrated in Fig. 2.

If it is desired to operate the system with a fixed direct-current voltage output or with the electrode 9 at a predetermined position, and to indicate a variation from either of these conditions, the points A and B may be conveniently employed as operating points. Slight movement of the electrode 9 in either direction from the points A and B will sharply and markedly decrease the magnitude of the voltage V. The points A and B may easily be located again, furthermore, by peaking the voltage output. Since the slope of the voltage curve to the left of the point A or to the right of the point B has been found customarily to be steeper than the slope of the linear portion A—B, as shown in Fig. 2, the relative voltage changes per unit movement of the electrode 9 may indicate in which direction the electrode has moved from the point A or B.

We have found that if, in a given tube, the pressure of the gas is increased, the slope of the linear portion A—B will, in general, increase also, producing greater tube sensitivity. The increase in pressure, however, usually decreases the value of the maximum output voltage $V_{max}$ at points A and B, and decreases the length of the region of the tube over which the linear characteristic A—B occurs.

As an illustration, for one particular experimental tube, a variation of tube sensitivity or slope of the characteristic curve with pressure of the gas within the tube was measured between 0.86 millimeter of mercury pressure to 2.2 millimeters pressure. Within this range, the tube sensitivity increased from 1.08 volts per millimeter deflection of the movable electrode 9 to 1.59 volts per millimeter deflection and the increase was substantially linear.

If, therefore, movements of the electrode 9 do not produce large enough direct-current voltages in the output circuit 2—4, the diffusion pump of the vacuum system 7 may be adjusted, or other adjustments in the vacuum system may be effected, as is well-known in the art, to increase the pressure of the gas in the tube 1, and thereby to increase the tube sensitivity.

It should be understood that the same effects may be produced by keeping the electrode 9 fixed and by varying the potential gradients between the electrode 9 and the principal electrodes by other means. The principal electrodes may, for example, be inserted into the envelope 1 through well-known air-tight bellows, not shown, so that either or both of the principal electrodes themselves may be moved relative to the electrode 9. With such a construction, the electrode 9 may be inserted within the envelope 1, and, indeed, the envelope itself may be made of conducting material to shield the system from stray fields.

It is not necessary, furthermore, that the alternating field produced by the oscillator 17 be directly impressed upon the principal electrodes. The field may be capacitively, inductively or otherwise impressed. In the embodiment of Fig. 10, for example, two further electrodes 6 and 8 are shown provided, and the alternating field of the oscillator 17 is directly applied between the movable electrode 9 and the electrodes 6 and 8. The alternating field is also capacitively impressed, however, between the electrode 9 and the principal electrodes 3 and 5 which feed the output circuit 2—4, since the electrodes 6 and 8 respectively provide capacitive coupling with the principal electrodes 3 and 5.

Other arrangements are also possible such as the use of a movable shield electrode 51, schematically shown in Fig. 11, that can vary the potential gradients within the tube depending upon its position. The electrode 51 may, of course, itself be connected to any voltage source having any desired polarity, or it may be grounded or at floating potential as shown.

Similarly, a multiple movable electrode system, such as the dual system 9—9' illustrated in Fig. 12, may be employed to vary the potential gradients within the tube 1. The output voltage V may then depend upon the difference in separation of the two rings 9 and 9'.

If the auxiliary ring or similar electrode 9 be omitted, and the tube 1 with its principal electrodes 3 and 5 be oriented in an alternating electric field sufficient to strike a glow in the tube, such as, for example, in the field between the condenser plates 19 and 21 in Fig. 3, which then serve as the auxiliary electrode means, or in a radio frequency radiation field, the direct-current voltage V will be produced in the output circuit 2—4 whenever one principal electrode is subjected to a higher electric field strength than the other principal electrode. The envelope 1, as an illustration, may be oriented with its long axis parallel to the lines of electric force produced between the two condenser plates 19 and 21, as shown. When the envelope 1 is symmetrically located between the plates 19 and 21, the two principal electrodes 3 and 5 will be at the same field strength and potential gradients of equal magnitude will be developed between the electrode 3 and the center of the envelope 1 and between the electrode 5 and the center of the envelope 1. A uniform ionization glow will be struck through the envelope and no resultant direct-current voltage V will be produced in the output circuit 2—4. As, however, the envelope 1 is moved to the left, for example, the electrode 3 will be subjected to a higher field strength than the electrode 5, and the potential gradients between each electrode and the center of the tube will no longer be the same. The glow discharge in the left-hand portion of the envelope 1 will be brighter than the glow discharge on the right-hand side of the tube. A resultant current flow will thus take place in the tube 1 from the left to the right, producing a positive voltage V in the output circuit 2—4. Similarly, if the tube 1 be moved over to the right within the alternating field, a negative voltage V will be produced. The characteristic performance of such a system will correspond to that shown in Fig. 2 as the tube is moved from right to left in the alternating field. The alternating field produced between the condenser plates or by a strong radiation field therefore gives rise to potential gradients within the tube in a manner similar to the way in which the third electrode 9 produces the alternating field within the tube.

A convenient radiation field-strength indicator is thus provided, which produces a direct-current indicating voltage in response to variations in field strength. Over a predetermined range, furthermore, a linear relationship between field strength and the direct-current indicating voltage may be obtained. By operating the tube 1 on a portion of its characteristic curve over which an approximate square-law variation occurs, such as in the region of the bends in the far left-hand or right-hand portion of the curve shown in Fig. 2, a voltage proportional to the energy or power of the field may be produced.

This mode of operation may also conveniently be applied to relay systems. In the example of Fig. 13, a thermoelement 55 responds to heat and energizes the moving coil 57 of a meter. An insulating rod 59 may be connected to the coil 57 so as to move therewith and an electrode 61 may be provided at the free end of the rod. An alternating field from the generator 17 may be impressed between the electrode 9 and the electrode 61. As the coil 57 is rotated in response to the thermoelectric current signal produced by the element 55, the electrode 61 will be caused to approach towards or to recede from the tube 1, thus varying the potential gradients within the tube and producing an output voltage V which may be used to operate a switch or any other relay-controlled circuit.

It has previously been mentioned that the principal electrodes may have any desired configuration or shape. We have, for example, successfully employed flat-disc electrodes as illustrated in Fig. 1, wire electrodes disposed parallel to the axis of the tube as illustrated in Figs. 4 and 6, rod electrodes and other electrode structures. Variations in the sensitivity of the tube, in the range of linear operation of the tube, in the maximum output voltage $V_{max}$ of the tube, and in other characteristics, of course, occur with different electrode designs and spacings. Under certain conditions, the sensitivity of the tubes appears to decrease as the space between the electrodes is decreased. The sensitivity of the tube, in general, appears to increase with increased electrode surface area. The reference or initial voltage in the output circuit and the value of $V_{max}$ also vary with electrode spacing.

Movable electrodes of any desired shape may also be employed. Narrow circular rings such as shown at 9 in Fig. 1, wider circular bands, wire-mesh electrodes, ring segments, flat metal electrodes, pointed electrodes and other electrode configurations have been successfully used. In one series of experiments, as an illustration, a movable ring electrode was employed with a helium-filled tube at 1.5 mm. pressure having two flat-disc principal electrodes spaced about 60 mm. apart and operating with a radio-frequency field of 40 megacycles and of 100 volts R. M. S. A value of $V_{max}=26.4$ volts was produced as was a linear characteristic curve extending throughout very nearly the complete length of the tube. A quarter-ring segment electrode used with the same tube under the same operating conditions, while producing about the same sensitivity as the complete ring, provided a linear characteristic along only half as much of the tube, and produced a maximum output voltage of about 14 volts. A pointed electrode, on the other hand, produced a sensitivity curve having only about a third the slope of that obtained with the ring electrodes, and a value of $V_{max}=4.7$ volts. To the left of the inversion point A, as well as to the right of the point B, in this last-named charateristic curve, in addition, the magnitude of the voltage V decreased sharply with movement of the movable electrode as shown in Fig. 2. For further electrode movement, the voltage changed polarity and then a second point of voltage inversion was obtained.

The pointed movable electrode, therefore, might be used where it is desired to have several points of inversion, while the complete ring or band electrode could be used to provide long and sensitive linear characteristics.

Depending upon the needs of the application to which the present invention is to be put, furthermore, envelopes of different dimensions and containing different gases may be used, as previously discussed. At micro-wave frequencies, as a further example, the tube dimensions or electrode spacings may be conveniently made resonant to the frequency of the micro-wave field.

Variations in potential gradients within the tube may also be produced electrically, as by connecting the tube into two arms of a variable impedance bridge circuit, illustrated in Fig. 4. A tiny "pea"-type neon tube 1 having internal wire electrodes 3 and 5, has been found admirably suited to the purposes of the present invention, when provided with an external metal-band electrode 9. The alternating field generator 17, having a voltage sufficient to ionize the neon tube, may be connected by conductor 23 to the external electrode 9, and by a conductor 25 to further conductors 27 and 29. These connections constitute the input circuit of the bridge. Conductor 27 is preferably connected through a condenser C to the principal electrode 5, and conductor 29 is preferably connected through the variable condenser Cv to the principal electrode 3. The direct-current output circuit 2—4 is shown connected across the principal electrodes 3 and 5.

Assume first, that the bridge arms containing condensers C and Cv have equal capacity. The principal electrodes 3 and 5 are then at the same alternating field strength with respect to the electrode 9 because of the physical symmetry of the principal electrodes and the electrode 9. No resultant current flow occurs between the principal electrodes 3 and 5 and there is then no output voltage V in the output circuit 2—4. If the value of the capacitance Cv is changed, say an increase, the impedance between the principal electrode 3 and the electrode 9 decreases. The glow discharge between the electrode 3 and the electrode 9 becomes stronger than the discharge between the electrode 5 and the electrode 9, since the potential gradients between electrode 9 and each of the principal electrodes are no longer of equal magnitude. A resultant current flow from the electrode 3 to the electrode 5 thus takes place and a positive direct-current voltage V appears across the output circuit 2—4. This has been found to be substantially equivalent to displacing the movable electrode as described in conjunction with Fig. 1. The creation of more intense glow discharges between one of the principal electrodes and the electrode 9 may be observed in the tube as occurring in exactly the same manner as when the electrode 9 itself is physically moved.

Regions of substantially linear relationship between the change in capacitance Cv and the resulting change in direct-current output voltage V have been found, similar to a portion of the region A—B shown in Fig. 2.

In Fig. 5, the sensitivity of an experimental bridge circuit employing a tube similar to the tube shown in Fig. 1 in a circuit similar to that illustrated in Fig. 4, is plotted. A 25 megacycle oscillator frequency was employed in this test and the variation of voltage V with various settings of the capacitance Cv was measured. A sensitivity of about one volt output per $10^{-12}$ farads capacitance change was obtained in this test. More sensitive results have, however, been obtained. The sensitivity, furthermore, was found to be substantially independent of the fixed position of the electrode 9, within certain limits. With an amplifier having a noise level of about $10^{-5}$ volts connected across the output circuit 2—4, changes in capacity of the order of $10^{-17}$ farads may be detected.

If, therefore, the variable condenser plates Cv are moved, oscillated, or rotated to produce more or less capacitance, the same effect takes place in the tube 1 and in the output circuit 2—4 as is produced by the physical movement of the tube 1 in the alternating field in Fig. 3, or by the movement of the electrode 9 in Fig. 1, though, of course, with the advantages of the easier and more convenient and accurately controllable operation resulting from utilizing variations in the capacitance of the condenser. The circuit of Fig. 4, therefore, may be employed in the same applications as those discussed in connection with the embodiments of Figs. 1 and 3. The use of capacitance variations, moreover, permits the universal use of the circuit with discharge tubes of any desired dimensions and shapes. It is to be understood that whatever the motion of the electrodes will do in the embodiments of Figs. 1 and 3, the variation in impedance, shown as capacitance, of the circuit of Fig. 4 will also accomplish. Though various devices employing these circuits have been illustrated in the present application as applied to one only of these embodiments, this is only in order to simplify the disclosure, for these devices may similarly be embodied in the circuits of the other embodiments.

It is not necessary, however, that the circuit of Fig. 4 be limited to capacitances alone. Any impedance means may be employed, such as, for example, inductors, not shown. Non-linear impedance elements may also be employed, since sensitivity calibration curves may be used to interpret the output voltage V.

An unknown capacity C may be readily measured in the simple bridge circuit of Fig. 4 by varying the capacitance Cv, as previously described, to produce a desired reference voltage. It is sometimes preferable, however, to employ a known fixed capacitance C and to insert the unknown capacitance in place of Cv. The value of V obtained would then yield the value of the unknown capacitance from a calibration curve similar to those illustrated in Fig. 5. This method of measurement is particularly valuable in determining the value of very small capacitances or in measuring condensers to a high degree of accuracy.

If the elements C and Cv are both variable condensers whose movable plates are 180 degrees out of phase and mounted on the same shaft, not shown, so that an increase in C is accompanied by a corresponding decrease in Cv, double the sensitivity may be obtained. As the impedance between one principal electrode and the electrode 9 decreases, and the potential gradients there between are correspondingly increased, the impedance between the other principal electrode and the electrode 9 increases instead of remaining at the same value, with a corresponding decrease in potential gradients. This same result obtains with other types of differential impedances such as that shown for illustrative purposes embodied in the microphone system of Fig. 6. A vibratory diaphragm 33 forms a capacitance 33—31 with a wire-mesh screen 31, corresponding to the capacitance C in Fig. 4, and forms also a capacitance 33—35 with the screen 35, corresponding to the capacitance Cv. As the diaphragm 33 is, for example, pushed to the right in response to some sound signal or other pressure-wave signal, it produces a response in the differential capacitances 33—31 and 33—35, increasing the capacitance 33—31 an amount dependent upon the strength of the signal, and correspondingly decreasing the capacitance 33—35. The output voltage V may be fed to an amplifier in the output circuit 2—4, and it will have a magnitude twice that which it would have had if one of the condensers remained fixed and the capacitance of the other condenser alone had been increased or decreased the given amount.

A greater sensitivity still may be obtained by mechanically ganging or otherwise moving the differentially operated condenser plates in synchronism with the movable electrode 9. In Fig. 7, as an example, as the plate 37 is moved closer to the plate 41 than to the plate 39, by the signal-controlled screw discussed in connection with Fig. 1, the electrode 9 is also moved closer to the principal electrode 3 than to the principal electrode 5. The impedance between the electrode 9 and the electrode 3 has been reduced by the mechanical movement of the movable electrode 9 and also by the increase in capacitance of the condenser 37—41. The impedance between the electrode 9 and the electrode 5 has similarly been correspondingly increased by the movement of the electrode 9 away from the electrode 5 and by the decrease in capacitance of the condenser 37—39. A four-way control over the sensitivity of the tube is thus afforded. The invention is not, of course, limited to the sensitivity provided by a four-way control, for there may be additional variable impedance elements, as well as additional movable electrodes, as before-mentioned.

With the external variable impedance or other means for varying the potential gradients within the tube, such as disclosed in the bridge circuits of Figs. 4, 6 and 7, the electrode 9 may be disposed within the envelope 1 and the envelope 1 may be constituted of conducting material to shield the tube from stray fields.

One of the important features of the present invention is that over relatively wide limits of position of the electrode 9 or variation of the capacitance $C_v$, the operation of the various embodiments of the invention may be substantially independent of voltage or frequency variations of the oscillator 17. The direct-current output voltage V has been found to remain substantially constant over a broad band of operating frequencies or wavelengths of the oscillator 17, for a given position of the electrode 9 of Fig. 1 within the limits A—B, or for an adjustment of the capacitance $C_v$ in Fig. 4. A constant response, for example, from about 28 meters to about 82 meters wavelength was found in one test with an 80 volt alternating field and a helium gas-filled tube under 1.98 millimeters pressure. While the length of the linear portion A—B of the characteristic curve, however, may sometimes vary with frequency, so that $V_{max}$ may be different for different frequencies, frequency bands have been found over which a substantially constant $V_{max}$ may be obtained. In a further test with the above-mentioned tube, for example, a constant value of $V_{max}$ was obtained from about 15 megacycles to about 45 megacycles with a slightly lower alternating field of 75 volts R. M. S.

Variations in R. M. S. voltage of the oscillator 17 within certain limits similarly will not affect the voltage V. With the location of the electrode 9 of the tube discussed in connection with Fig. 1 at $x=21.8$ mm., for example, the R. M. S. value of the 26.5 megacycle oscillator voltage may be varied from 150 volts down to 100 volts with no substantial change in the value of the output voltage V. Over substantially the same range, the sensitivity of the tube remains substantially constant also. With the electrode 9 close to one of the principal electrodes, however, variations of the voltage V with voltage of the oscillator have been detected.

Operation within the frequency bands and the voltage bands over which the system is substantially independent of frequency and voltage, is extremely valuable in the bridge circuit embodiments of the present invention. None of the usual compensating circuits or refined control circuits are needed to prevent frequency drift or variations in voltage of the alternating current generator that upset the calibration of conventional bridge circuits.

If, on the other hand, it is desired purposely to increase or decrease the sensitivity of the tube by varying the frequency, frequency bands have been found over which an increase in frequency, as an illustration, will produce an increase in the slope of the characteristic curve A—B. Other frequency bands have also been observed, furthermore, over which the value of V and the value of $V_{max}$ will vary substantially linearly with frequency. Such a region was found from 2.57 to about 8 megacycles, for example, in a tube similar to the one illustrated in Fig. 1, operated at 1.93 mm. pressure and with a 75 volt alternating field.

Similarly, the system may, if desired, be operated between voltage limits within which the value of $V_{max}$ increases with increasing R. M. S. voltage of the oscillator 17. We have found, as an illustration, a substantially linear variation of $V_{max}$ with applied alternating current field of 26.5 megacycles frequency in a tube of helium under 1.60 mm. pressure. This variation was from $V_{max}=12.5$ volts at 108 volts R. M. S., to $V_{max}=40$ volts at 146 volts R. M. S.

By adjusting the frequency or the applied voltage, therefore, operating regions having almost any desired characteristic, including substantially linear, square, cubic or exponential characteristics, as illustrations, may be produced. The selection of the gas, the gas pressure, the electrode structures, the positioning of the electrodes, etc., afford further means for producing the desired sensitivity and response, as previously discussed in detail. The invention thus provides an extremely flexible system.

There are many instances where it is desirable to produce a voltage proportional to the angular position of a shaft. Usually this has been done by self-synchronous motors and generators. It has also been done by an electrostatic method comprising displacing a dielectric between condenser plates, as described by Bush and Caldwell in an article describing the differential analyzer at the Massachusetts Institute of Technology, in the Journal of the Franklin Institute, page 278, 1945. It is important in applications, such as the said differential analyzer, that no substantial torque be imposed on a rotating shaft and that the voltages developed respond rapidly to changes of angular orientation of the shaft. By using a rotatable condenser for the variable condenser $C_v$ in Fig. 4 or in the other bridge-circuit embodiments, a very sensitive torque-less angle indicator is provided, the output voltage of which may be proportional to the angular rotation of the condenser shaft. The same results may be obtained by employing an external electrode 9, Fig. 8, which may be rotated about the tube 1 integrally with or in synchronism with the rotation of a shaft or other device 43. The angular position of the electrode 9 about the tube 1 may be linearly related to the output voltage V, as before described.

The present invention also provides a simple pressure indicator which has particular use in telemetering applications. The movement of the diaphragm 33 in Fig. 6, for example, in response to an external pressure, such as that produced by the wind or the atmosphere, will cause changes in the capacity 33—31 and 35—33 which produce potential gradient differentials in the tube 1 and corresponding output voltages V. Similarly, pressure on the electrode 9 will produce displacements of the electrode 9 and resulting voltage indications which may be directly proportional to the pressure. A tube sealed in a vacuum system, such as the system 7 schematically shown in Fig. 1, furthermore, may be calibrated, and variations in external pressure may be correlated with the voltage developed in the output circuit 2—4, as earlier explained.

We have applied this principle also to a medical pressure indicating instrument embodying a circuit similar to that shown in Fig. 4. The pressure produced against a condenser plate of the condenser $C_v$ by blood circulating in the finger was found to move the condenser plates sufficiently to produce a corresponding voltage V. The variations of the voltage V with time have been displayed on a tape recorder, giving data not only on the cardiological condition of the heart, but also on the frequency of the heartbeat and on the blood-pressure.

The present invention also finds convenient application as a phonograph pick-up device. Either the actual movement of the external electrode 9 mechanically connected to the phonograph needle, or the change in capacity of the condenser $C_v$ when one of its plates is mechanically connected to the needle, may be employed. A voltage V will be produced proportional to the displacement of the needle over the complete frequency band used in the recording. This pick-up, furthermore, unlike the present-day piezo-electric pick-ups which require that the stylus arm push against the sides of the record grooves in order to deform the crystal, does not require that the needle firmly push against the sides of the record groove. A saving in wear of the records is therefore produced.

A substantially torque-less gyroscopic pick-off may also be constructed in accordance with the present invention. An angle indicator device similar to that illustrated in Fig. 8 may be employed. Since it is usually only necessary however, to know the gyroscope position over a small angle, as in the case of a ship's gyroscope or an airplane's automatic pilot, for example, the electrode 9 may be attached by means of a counter-balanced arm, not shown, to the gyroscope. The tube 1, furthermore, may preferably be bent to lie along the arc of a circle whose radius is the distance from the long axis of the pivot point of the gyroscope.

The bridge circuit may also be conveniently adapted to measure changes in conductivity or in dielectric constant. In the circuit of Fig. 9, as an illustration, a container such as a test tube 49 containing a liquid may be inserted between two electrodes 45 and 47. A slight change in concentration of the liquid or in the liquid level will produce a change in the dielectric between the electrodes 45 and 47, and a corresponding voltage in the meter M in the output circuit 2—4. The electrodes 45 and 47 may also be strapped about a limb or adjacent to a prominent blood vessel in order to measure circulation time when a die is injected into the blood stream, or for other purposes.

Sheets of material, such as paper, for example, may be passed between the electrodes 45 and 47 to measure changes in thickness or other dimensions, or changes in composition of the material.

It is to be understood that the output circuit 2—4, in all the embodiments of the present invention, in cases where smoothing and alternating current suppression are important, may be provided with conventional smoothing filters, not shown, and with alternating-field filters, such as the chokes shown in Fig. 9, as is well-known in the art.

Further modifications will occur to those skilled in the art and all such are considered to fall within the spirit and scope of the present invention as defined in the appended claims.

What is claimed is:

1. An electric system having, in combination, a gaseous-discharge tube provided with two principal electrodes and an auxiliary electrode, an output circuit connected between the two principal electrodes, means for producing a periodic signal, means controlled in accordance with the periodic signal for periodically increasing and decreasing the impedance between the auxiliary electrode and one of the principal electrodes, means for impressing an alternating electric field between one of the principal electrodes and the auxiliary electrode of such magnitude that a direct-current voltage is produced in the output circuit without the aid of a source of energy therein, and means for operating the impedance-increasing-and-decreasing means within limits such that the output voltage has one polarity as the impedance between the auxiliary electrode and the said one principal electrode is increased, and the reverse polarity as the impedance is decreased, the reversal in polarity of the voltage occurring at the same periodicity as that of the periodic signal.

2. An electric system having, in combination, a gaseous-discharge tube provided with two principal electrodes and auxiliary electrode means fixed in position with respect to the principal electrodes, an output circuit connected between the principal electrodes, means for impressing an alternating electric field upon the auxiliary electrode means of sufficient magnitude to ionize the gas in the tube so as to produce a direct-current voltage in the output circuit without the aid of a source of energy therein, and means for varying the impedance between one of the principal electrodes and the fixed auxiliary electrode means correspondingly to vary the voltage in the output circuit.

3. An electric system having, in combination, a gaseous-discharge tube provided with two principal electrodes and an auxiliary electrode the position of which with respect to one of the principal electrodes may be varied, an output circuit connected between the two principal electrodes, means for impressing an alternating electric field between one of the principal electrodes and the auxiliary electrode of sufficient magnitude to ionize the gas in the tube so as to produce a direct-current voltage in the output circuit without the aid of a source of energy therein, means for varying the impedance between one of the principal electrodes and the auxiliary electrode, and means operating synchronously with the last-named means for varying the position of the auxiliary electrode with respect to the said one principal electrode so as to augment the said impedance variation and correspondingly to vary the output voltage.

4. An electric system having, in combination, a gaseous-discharge tube provided with two principal electrodes and an auxiliary electrode fixed in position with respect to the principal electrodes, an output circuit connected between the two principal electrodes, means for impressing an alternating electric field between one of the principal electrodes and the auxiliary electrode of sufficient magnitude that a direct-current voltage is produced in the output circuit without the aid of a source of energy therein, means for adjusting the frequency and the magnitude of the alternating electric field within limits such that the output voltage remains substantially constant, and means for increasing and decreasing the impedance between the fixed auxiliary electrode and one of the principal electrodes correspondingly to vary the output voltage.

5. An electric system as claimed in claim 2 and in which voltage-responsive means comprising an amplifier is connected in the output circuit and controlled by the output voltage.

6. An electric system as claimed in claim 2 and in which combination, voltage-responsive means comprising an amplifier and a recording instrument is connected in the output circuit and controlled by the output voltage.

7. An electric system as claimed in claim 2 and in which voltage-responsive means comprising an indicator is connected in the output circuit and controlled by the output voltage.

8. An electric system having, in combination, means comprising an ionizable medium provided with two principal electrodes and an auxiliary electrode, a source of alternating-current potential for producing between a pair of terminals a potential of magnitude sufficient to ionize the medium, means for capacitively connecting each of the principal electrodes to one of the terminals, means for connecting the auxiliary electrode to the other terminal, an output circuit connected between the principal electrodes whereby a direct-current voltage may be produced in the output circuit without the aid of a source of energy therein, means responsive to angular movements, and means controlled by the last-named means for varying the capacitance in the connection of at least one of the principal electrodes in response to the angular movements to produce corresponding variations in the voltage in the output circuit.

9. An electric system having, in combination, means comprising an ionizable medium provided with two principal electrodes and an auxiliary electrode, differential alternating-current-coupling capacitance means for applying alternating-current potentials between the auxiliary electrode and each of the principal electrodes to ionize the medium, an output circuit connected between the principal electrodes whereby a direct-current voltage may be produced in the output circuit in response to the ionization of the medium without the aid of a source of energy therein, the differential capacitance means having signal-responsive means for simultaneously varying the capacitance coupling between the auxiliary electrode and each of the principal electrodes in opposite senses, thereby varying the potential gradients between the principal electrodes in response to a signal to produce corresponding signal-controlled variations in the voltage in the output circuit.

10. An electric system having, in combination, means comprising an ionizable medium provided with two principal electrodes and an auxiliary electrode, differential alternating-current-coupling capacitance means for applying alternating-current potentials between the auxiliary electrode and each of the principal electrodes to ionize the medium, an output circuit connected between the principal electrodes whereby a direct-current voltage may be produced in the output circuit in response to the ionization of the medium without the aid of a source of energy therein, means for initially adjusting the capacitance coupling to produce symmetrical potential gradients between the auxiliary electrode and the principal electrodes in order to produce no voltage in the output circuit, the differential capacitance means having signal-responsive means for simultaneously varying the capacitance coupling between the auxiliary electrode and each of the principal electrodes in opposite senses, thereby varying the potential gradients between the principal electrodes in response to a signal to produce corresponding signal-controlled variations in the voltage in the ouput circuit.

11. An electric system as claimed in claim 2 and in which there is provided means for producing a signal, and means for controlling the said means for varying the impedance between one of the principal electrodes and the fixed auxiliary electrode means in accordance with the signal producing means correspondingly to signal-vary the voltage in the output circuit.

12. An electric system as claimed in claim 2 and in which there is provided means for producing linear movements, and means for controlling the said means for varying the impedance between one of the principal electrodes and the fixed auxiliary electrode means in accordance with the said linear-movement-producing means correspondingly to vary the voltage in the output circuit.

13. An electric system having, in combination, a gaseous-discharge tube provided with two principal electrodes and an auxiliary electrode fixed in position with respect to the principal electrodes, an output circuit connected between the principal electrodes, means for impressing an alternating electric field between at least one of the principal electrodes and the auxiliary electrode of sufficient magnitude to ionize the gas in the tube so as to produce a direct-current voltage in the output circuit without the aid of a source of energy therein, means for producing angular movements, and means for varying the impedance between one of the principal electrodes and the fixed auxiliary electrodes in accordance with the said movements correspondingly to vary the voltage in the output circuit.

14. An electric system as claimed in claim 2 and in which there is provided means for producing mechanical movements, and means for controlling the said means for varying the impedance between one of the principal electrodes and the fixed auxiliary electrode means in accordance with the said movement-producing means correspondingly to vary the voltage in the output circuit.

15. An electric system as claimed in claim 2 and in which the alternating electric field is a radio-frequency field.

16. An electric system as claimed in claim 2 and in which the alternating electric field is an audio-frequency field.

17. An electric system as claimed in claim 1 and in which the said impedance increasing and decreasing means comprises means whereby the auxiliary electrode and the said one principal electrode may be moved relative to one another.

18. An electric system as claimed in claim 1 and in which the said impedance increasing and decreasing means comprises a variable impedance element the electrical impedance value of which may be varied.

19. An electric system as claimed in claim 2 and in which there is provided pressure-responsive means for controlling the said impedance-varying means.

20. An electric system as claimed in claim 2 and in which there is provided temperature-responsive means for controlling the said impedance-varying means.

21. An electric system having, in combination, a gaseous-discharge tube provided with two principal electrodes and an auxiliary electrode fixed in position with respect to the principal electrodes, an output circuit connected between the principal electrodes, means for impressing an alternating electric field between one of the principal electrodes and the auxiliary electrode of sufficient magnitude to ionize the gas in the tube so as to produce a direct-current voltage in the output circuit without the aid of a source of energy therein, vibration-responsive means, and means controlled by the vibration-responsive means for varying the impedance between one of the principal electrodes and the fixed auxiliary electrode correspondingly to vary the voltage in the output circuit.

22. An electric system as claimed in claim 2 and in which the said impedance-varying means comprises capacitance means having any of a plurality of different capacitance values.

23. An electric system having, in combination, means comprising an ionizable medium provided with two principal electrodes and an auxiliary electrode fixed in position with respect thereto, a source of alternating-current potential for producing between a pair of terminals a potential of magnitude sufficient to ionize the medium, a pair of capacitance means for capacitively connecting each of the principal electrodes to one of the terminals, means for connecting the auxiliary electrode to the other terminal, an output circuit connected between the principal electrodes whereby a direct-current voltage may be produced in the output circuit without the aid of a source of energy therein, one of the capacitance means having a fixed reference value and the other capacitance means comprising a pair of further electrodes between which may be disposed a medium of varying dielectric constant in order that the said other capacitance means may present any of a plurality of different capacitance values in the said connection of one of the principal electrodes, thereby to produce variations in the voltage in the output circuit indicative of the difference in capacitance between the said pair of capacitance means.

24. An electric system having, in combination, means comprising an ionizable medium provided with two principal electrodes and an auxiliary electrode fixed in position with respect thereto, a source of alternating-current potential for producing between a pair of terminals a potential of magnitude sufficient to ionize the medium, a pair of capacitance means for capacitively connecting each of the principal electrodes to one of the terminals, means for connecting the auxiliary electrode to the other terminal, an output circuit connected between the principal electrodes whereby a direct-current voltage may be produced in the output circuit without the aid of a source of energy therein, one of the capacitance means having a fixed reference value and the other capacitance means comprising a pair of further electrodes between which may be disposed a liquid medium the level of which varies the capacitance of the said other capacitance means to present any of a plurality of different capacitance values in the said connection of one of the principal electrodes, thereby to produce variations in the voltage in the output circuit indicative of the difference in capacitance between the said pair of capacitance means.

25. An electric system having, in combination, means comprising an ionizable medium provided with two principal electrodes and an auxiliary electrode fixed in position with respect thereto, a source of alternating-current potential for producing between a pair of terminals a potential of magnitude sufficient to ionize the medium, a pair of capacitance means for capacitively connecting each of the principal electrodes to one of the terminals, means for connecting the auxiliary electrode to the other terminal, an output circuit connected between the principal electrodes whereby a direct-current voltage may be produced in the output circuit without the aid of a source of energy therein, one of the capacitance means having a fixed reference value and the other capacitance means comprising a pair of further electrodes between which may be disposed a liquid medium the concentration of which varies the capacitance of the said other capacitance means to present any of a plurality of different capacitance values in the said connection of one of the principal electrodes, thereby to produce variations in the voltage in the output circuit indicative of the difference in capacitance between the said pair of capacitance means.

26. An electric system having, in combination, a gaseous-discharge tube provided with two principal electrodes and auxiliary electrode means, the relative positions of the principal electrodes and the auxiliary electrode means being variable, an output circuit connected between the two principal electrodes, means for impressing an alternating electric field upon the auxiliary electrode means of magnitude sufficient to ionize the gas in the tube so as to produce a direct-current voltage in the output circuit without the aid of a source of energy therein, the voltage in the output circuit being substantially zero at one of the said relative positions and of positive and negative polarities at positions disposed in opposite directions from the said one position, means for producing mechanical movements, and means controlled by the mechanical-movement-producing means for varying the said relative positions, correspondingly to vary the voltage in the output circuit with the value and polarity of the output-circuit voltage corresponding to the direction and amount of the variation of the said relative positions from the said one position.

27. An electric system as claimed in claim 26 and in which the said auxiliary electrode means is movable angularly with respect to the said principal electrodes.

28. An electric system having, in combination, an ionizable medium provided with two principal electrodes and auxiliary electrode means, the relative positions of the principal electrodes and the auxiliary electrode means being variable, an output circuit connected between the two principal electrodes, means for impressing an alternating electric field upon the auxiliary electrode means of magnitude sufficient to ionize the medium so as to produce a direct-current voltage in the output circuit without the aid of a source of energy therein, the voltage in the output circuit being substantially zero at one of the said relative positions and of positive and negative polarities at positions disposed in opposite directions from the said one position, means for producing mechanical movements, and means controlled by the mechanical-movement producing means for varying the said relative positions, correspondingly to vary the voltage in the output circuit with the value and polarity of the output-circuit voltage corresponding to the direction and amount of the variation of the said relative positions from the said one position.

29. An electric system as claimed in claim 26 and in which the mechanical-movement-producing means is controlled to operate within limits where the output voltage varies substantially linearly with the variations in the said relative positions.

30. An electric system as claimed in claim 26 and in which the mechanical-movement-producing means is controlled to operate in regions beyond the limits where the output voltage varies substantially linearly with the variations in the said relative positions.

31. An electric system having, in combination, means comprising an ionizable medium provided with two principal electrodes and an auxiliary electrode, a source of alternating-current potential for producing between a pair of terminals a potential of magnitude sufficinet to ionize the medium, means for connecting each of the principal electrodes to one of the terminals through variable capacitance, means for connecting the auxiliary electrode to the other terminal, an output circuit connected between the principal electrodes whereby a direct-current voltage may be produced in the output circuit without the aid of a source of energy therein, means responsive to movements, means controlled by the last-named means for varying the capacitance in the connection of at least one of the principal electrodes in response to the movements to produce corresponding variations in the voltage in the output circuit, and direct-current-voltage-responsive means connected in the output circuit for responding to the movement-produced direct-current voltages.

32. An electric system having, in combination, means comprising an ionizable medium provided with two principal electrodes and an auxiliary electrode, alternating-current-coupling capacitance means for applying alternating-current potentials between the auxiliary electrode and each of the principal electrodes to ionize the medium, an output circuit connected between the principal electrodes whereby a direct-current voltage may be produced in the output circuit in response to the ionization of the medium without the aid of a source of energy therein, means for initially adjusting the capacitance coupling to produce symmetrical potential gradients between the auxiliary electrode and the principal electrodes in order to produce no voltage in the output circuit, the capacitance means having signal-responsive means for simultaneously varying the capacitance coupling between the auxiliary electrode and each of the principal electrodes in opposite senses, thereby varying the potential gradients between the principal electrodes in response to a signal to produce corresponding signal-controlled variations in the voltage in the output circuit, and direct-current-voltage-responsive means connected in the output circuit for responding to the signal-produced direct-current voltages.

References Cited in the file of this patent

UNITED STATES PATENTS

| Number | Name | Date |
|---|---|---|
| Re. 13,779 | Von Lieben et al. | July 21, 1914 |
| 841,387 | De Forest | Jan. 15, 1907 |
| 1,127,371 | Pierce | Feb. 2, 1915 |
| 1,316,484 | Jonas | Sept. 16, 1919 |
| 1,450,749 | Pierce | Apr. 3, 1923 |
| 1,627,231 | Chaffee | May 3, 1927 |
| 1,976,500 | Imaoka | Oct. 9, 1934 |
| 2,003,945 | Logan | June 4, 1935 |
| 2,036,084 | Roder | Mar. 31, 1936 |
| 2,149,847 | Kolin | Mar. 7, 1939 |
| 2,152,639 | Edgerton | Apr. 4, 1939 |
| 2,318,936 | Fisher | May 11, 1943 |
| 2,509,780 | O'Dea | May 30, 1950 |
| 2,544,078 | Glassbrook | Mar. 6, 1951 |
| 2,602,914 | Schlesman et al. | July 8, 1952 |

OTHER REFERENCES

Gasentladungen bei Sehr Hohen Frequenzen, by Lothar Rohde, pp. 569–599. Annalen der Physik, vol. 12, 1932; esp. pp. 591 and 592.

Gasentladungen bei Sehr Hohen Frequenzen, by Lothar Rohde, pp. 550 and 551, Physikalische Zeitschrift, vol. 32, 1931.